Oct. 27, 1959   R. A. ENGELHARDT   2,910,558
ELECTRICAL PHASE SEQUENCE SWITCH
Filed Sept. 30, 1957

INVENTOR.
RICHARD A. ENGELHARDT
BY
Julian C. Renfro
ATTORNEY

Oct. 27, 1959    R. A. ENGELHARDT    2,910,558
ELECTRICAL PHASE SEQUENCE SWITCH
Filed Sept. 30, 1957    2 Sheets-Sheet 2

INVENTOR.
RICHARD A. ENGELHARDT
BY
Julian C. Renfro
ATTORNEY

United States Patent Office 2,910,558
Patented Oct. 27, 1959

2,910,558

ELECTRICAL PHASE SEQUENCE SWITCH

Richard A. Engelhardt, Parkville, Md., assignor to The Martin Company, Middle River, Md., a corporation of Maryland Application September 30, 1957, Serial No. 686,950

7 Claims. (Cl. 200—92)

The present invention relates to an electrical switch responsive to the phase sequence of a multiphase power source, and more particularly to a phase sequence relay switch adapted to prevent the connection of a multiphase power source to a load unless the correct phase relations exist.

The invention finds particular application in connection with the use of external multiphase power sources for the starting and running of aircraft motors such as the motors employed for driving fans, hydraulic pumps and the like on an aircraft. When so employed, the invention makes it impossible to connect the power source to the motors in reversed phase sequence so as to cause the motors to tend to rotate in an undesired or reverse direction.

In accordance with the invention the phase sequence switch includes a small alternating current electric motor having a rotatable shaft, and a multiphase winding adapted to cause rotation of the shaft when the small motor is energized from a multiphase power source. The said winding arrangement is adapted to reverse the direction of rotation of the shaft in response to a reversal in the phase of the applied multiphase source. A switch arm mounted upon the motor shaft and adapted to be rotated thereby, and a switch contact with which the arm makes contact completes the switch assembly.

Preferably a two-phase induction motor is employed as the small alternating current motor actuating the phase sequence switch. Such a motor may be operated continuously in a stalled or "locked rotor" condition. This is particularly advantageous in that this type of motor will maintain the switch arm against the stationary switch contact until either the multiphase power source is disconnected or the phase sequence is reversed despite the fact that the motor may be stalled by the opposing torque produced when the rotating arm is in contact with the switch contact.

The invention is not, however, limited to a motor of this type. For example, a three-phase motor is capable of reversing its direction of rotation in response to a reversal in the phase sequence of the applied power. In addition, a small motor may be employed which may not be stalled in "locked rotor" position. In such case a drag friction device may be employed to prevent further rotation of the arm when in contact with either of the switch contacts, but to permit continued shaft rotation.

Advantageously, a pair of stationary switch contacts may be arranged and interposed in the path of the switch arm on either side of an intermediate neutral position. In this way reversal of the phase sequence of the multiphase power source will cause the switch arm to be rotated from one switch contact to the other. The switch thus performs a selection in response to phase sequence reversal and effects the desired connection in proper phase sequence.

The invention may be best understood by referring to the following drawings in which.

Figure 1:
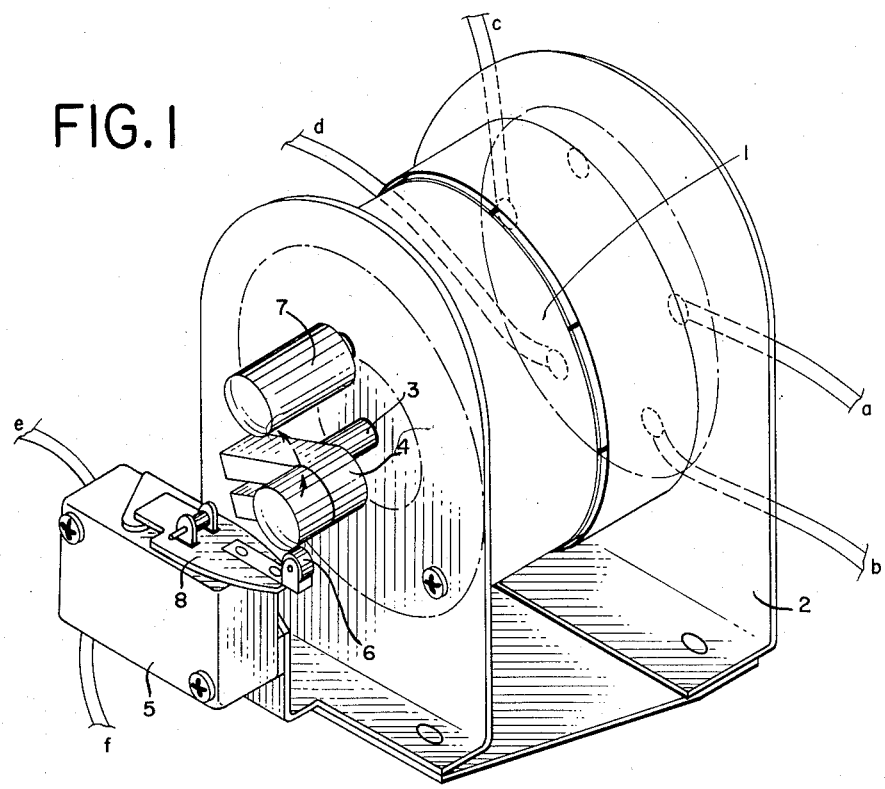
Figure 1 is a perspective illustration of an electrical phase sequence switch in accordance with the invention.

Referring to Figure 1, the phase sequence switch comprises a small alternating current motor 1 mounted on a support bracket 2. The motor is, in this case, of the two-phase induction type. The input energy to one winding of the motor is connected through leads $a$ and $b$, while the input energy to the other winding is connected through leads $c$ and $d$. The motor is also provided with a shaft 3 to which is attached a radial extension 4. The radial extension is adapted to act as the movable striker arm of the switch assembly. Connected to the bracket 2 is a suitable switch 5, which may be a standard product of manufacture, such as a microswitch as illustrated. The switch is arranged so that a roller 6 forming a part of the switch actuator arm 8 is located within the rotary path of the extension 4. Thus the microswitch is actuated, when the striker arm 4 is rotated into contact with the roller 6, by the closing of the switch contacts, which do not, of course, appear in Figure 1. Rotation of extension 4 is halted either by actuator 8 bottoming against the side of the switch or by a stop (not shown). A stop 7 attached to the bracket 2 is provided to limit the travel of the arm 4 if it rotates in the opposite direction. A suitable spring (not shown) is responsible for biasing the actuator 8 to the switch-open position when the arm 4 is not being driven by the motor in the switch operating direction. The output leads $e$ and $f$ of the switch may be connected in the desired circuit, such as in the circuit of a main line relay switch as described hereinafter.

Figure 2:
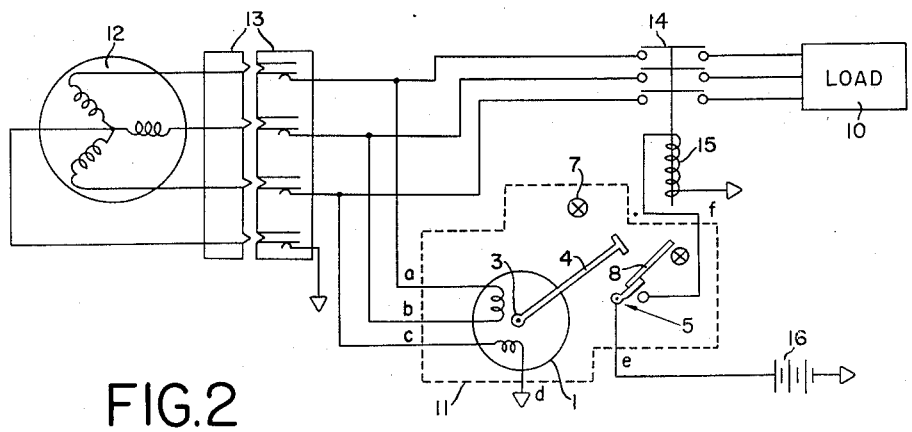
Figure 2 is a circuit diagram of the switch of Figure 1 in combination with a multiphase power source.

The switch illustrated in Figure 1 has particular application in preventing the connection of a multiphase power source to the motors of an aircraft if the phase sequence of the power source is incorrect. Figure 2 illustrates a system wherein the switch is thus employed, the load 10 being representative of an aircraft motor, while the switch is illustrated schematically within the dotted enclosure 11. The motor components in the schematic illustration are numbered in correspondence with Figure 1.

Conventionally the multiphase, in this case three-phase, power source 12 would be directly connected to the load 10 through mating connectors 13. In that event were the phase sequence of the power source to be incorrectly reversed, the motor 10 would tend to rotate in a reverse direction, causing damage. In accordance with the present invention, a three-pole main line relay switch 14 is inserted in the power line so that each phase of the line may be switched on or off by means of relay coil 15. The power for the relay coil is provided by battery 16 connected through the leads $e$ and $f$ of switch 5. In this way the relay coil 15 is actuated to close the power lines only when the actuator 8 of switch 5 has moved so as to close the switch contacts.

The switch of the invention is then made responsive to the phase sequence of the power source 12 by connecting the winding $a$—$b$ of the motor 1 across two phases of the three-phase power source, while its other winding $c$—$d$ is connected across the other phase of the power source by bringing point $d$ to a neutral position, commonly ground. This energizing connection produces a phase relationship of 90° between windings $a$—$b$ and $c$—$d$ as required by a two-phase motor. In addition this winding arrangement has the desired effect of reversing the rotation of the shaft 3 in the event any two of the three leads from the power source 12 are interchanged, or a sequence reversal in the three-phase power source occurs. In the illustrated embodiment, the windings should, of course, be connected so that a correct phase sequencing of the three-phase power source causes the shaft 3 to rotate in the clockwise direction so that the striker arm 4 moves to close switch 5, bringing about the energizing of relay 15 and the closing of switch 14 to connect power to load 10. An incorrect phase sequencing will then result in a counterclockwise rotation of extension 4 against stop 7 thus opening switch 5 and switch 14 to provide the protection required.

In the phase sequence switch of Figure 1 extension 4 acts as a striker arm for actuating the microswitch 5 through actuator arm 8. The invention is not, however, so limited. For example, extension 4 may be made conductive thereby to act as an actuator arm in association with conductive stop elements which act as switch contacts, or the actuator arm(s) may be made to act as the circuit-closing elements; note this type of arrangement in Figure 4. To encompass these alternatives and the many others which will be apparent to those familiar with the art, the extension arm 4 will be referred to throughout the specification and claims as a "switch arm," while the term "stationary switch contact" will be employed to describe a stop element interposed in the rotary path of the switch arm regardless of the form this element may take.

Provision should be made in the invention for a stalled motor condition due to the fact that the arm 4 is prevented from rotating when in touch with either stationary contact in its path. The use of a two-phase induction motor is quite suitable for this purpose, as are three-phase induction motors, since they continue to operate in a stalled "locked rotor" condition. Thus when the arm 4 contacts either the stop 7 or the switch actuator 8, the motor continues to maintain the arm against either contact despite the opposing force which stalls the motor. However, it is advisable with such operation to provide means for dissipating the heat from the stalled motor. In the embodiment of Figure 1, the bracket assembly 2 provides radiation fins which effect such dissipation.

Figure 3:
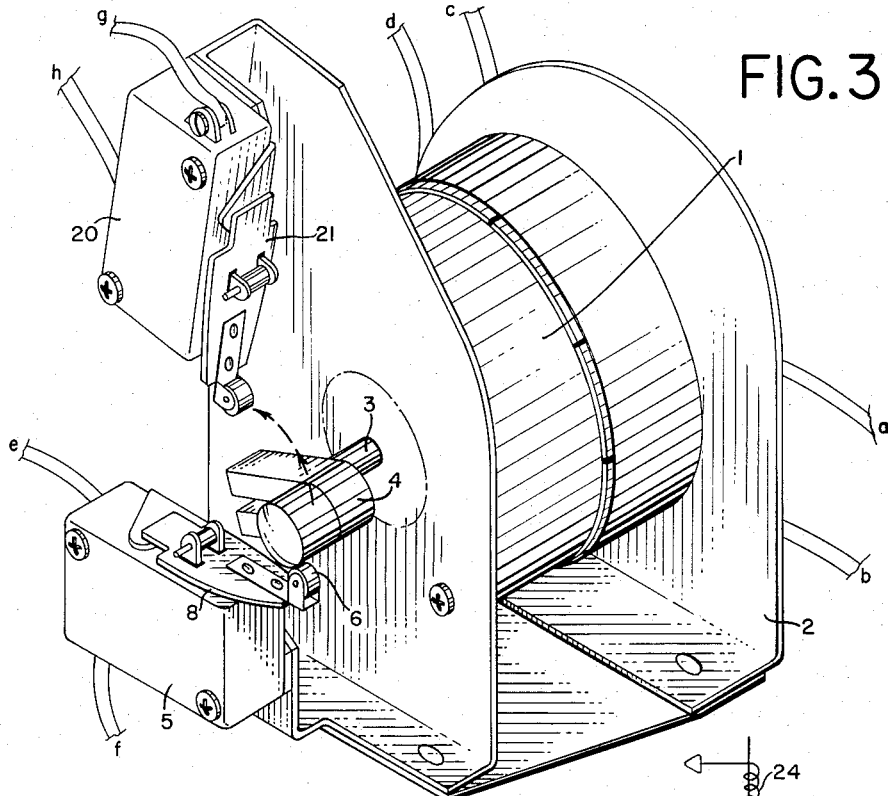
Figure 3 is a perspective illustration of an alternative embodiment of the phase sequence switch of the invention.

Referring now to Figure 3, there is illustrated an alternative embodiment of the phase sequence switch of Figure 1 wherein identical components are similarly numbered. This embodiment differs in that stop 7 is replaced by a switch 20 having an actuator arm 21 and leads g and h.

Figure 4:
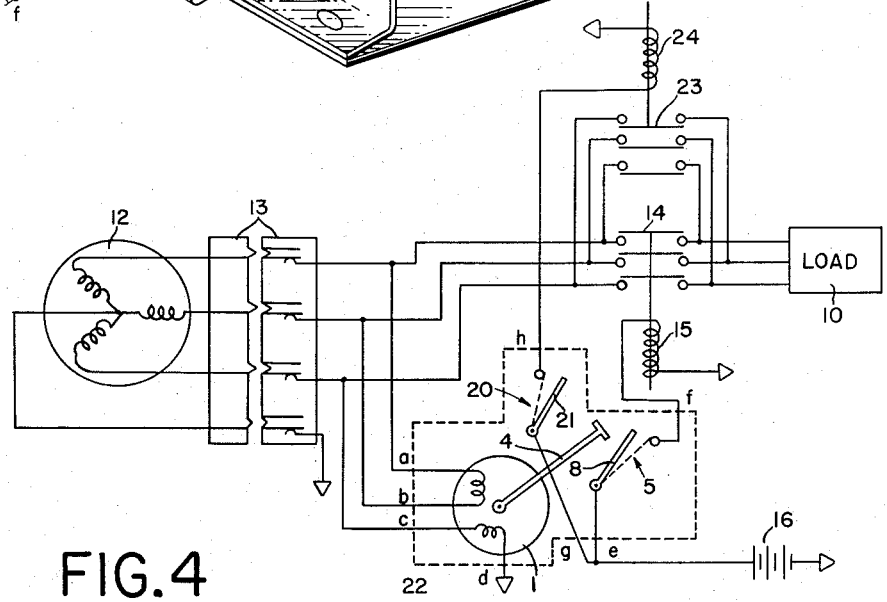
Figure 4 is a circuit diagram of the switch of Figure 3 in combination with a multiphase power source.

Switch 20 may, of course, be a microswitch as illustrated in Figure 3, or else be of a construction in which actuator arm 8 itself forms the circuit-closing element as indicated in Figure 4. As will be seen from latter figure, a circuit is illustrated which is used in protecting a load 10 from improper phase sequencing of the power source 12, but incorporating the type of phase sequence switch of Figure 3. The switch is shown within dotted enclosure 22 while components identical to those of Figure 2 are correspondingly numbered. Relay switch 14 is again inserted in a normally open position within the three-phase line so that each phase of the line may be switched on or off by means of relay coil 15. The coil derives power from battery 16 through the actuator arm 8 of switch 5. In this case, however, the line is further provided with a relay switch 23 operated by means of a relay coil 24. The switch 23 is connected in a normally open position within a parallel circuit bypassing switch 14 and connected so as to interchange two of the power lines with respect to one another. This coil 24 is connected through contact arm 21 of switch 20 to the battery 16 so that relay coil 24 is actuated only when switch 20 is in its closed position.

When the phase sequencing of the power source 12 is correct, the operation of the circuit of Figure 4 is the same as the circuit of Figure 2. That is, striker arm 4 of motor 1 closes switch 5 thereby closing line switch 14 and permitting power to flow to the load 10. However, this circuit in comparison to the circuit of Figure 2 does not prevent the flow of power to load 10 when the phase sequencing is incorrect. Rather it corrects the phase sequencing by means of the parallel circuit including line switch 23. Thus when the phase sequencing is nominally incorrect, striker arm 4 of motor 1 rotates in a counterclockwise direction opening switch 8 and line switch 14; and closing switch 20 to close line switch 23, whereby an interchange of two of the power lines is effected through the parallel circuit and the correct phase sequencing is applied to load 10.

Preferred embodiments of the invention have been described. Various changes and modifications may be made within the scope of the invention as set forth in the appended claims. For example, the phase sequence switch may be connected to provide a warning of phase sequence reversal rather than to effect a preventative switching operation.

I claim:

1. An electrical switch arrangement responsive to the phase sequence of a multiphase power source and arranged to prevent the application of improper sequence power to a multiphase load system, comprising a small alternating current electric motor having a rotatable shaft, and a multiphase winding adapted to rotate said shaft when connected to said power source and to reverse the direction of rotation of said shaft in response to a reversal in the phase sequence of the said multiphase source, a switch arm arranged upon and rotatable with said shaft, and a pair of spaced stationary switch contacts in the rotary path of said switch arm disposed on either side of an intermediate neutral arm position, whereby upon proper phase sequence said switch arm will rotate to close one switch so that electric current can flow therethrough, whereupon reversal of the phase sequence of said multiphase power source causes said switch arm to rotate from one said switch contact to the other said switch contact.

2. An electrical switch arrangement responsive to the phase sequence of a multiphase power source and arranged to prevent the application of improper sequence power to a multiphase load system, comprising a small alternating current electric motor having a rotatable shaft, and a multiphase winding adapted to rotate said shaft when connected to said power source and to reverse the direction of rotation of said shaft in response to a reversal in the phase sequence of the said multiphase source, a striker arm arranged upon and rotatable with said shaft, and a pair of spaced stationary contacts in the rotary path of said striker arm disposed on either side of an intermediate neutral arm position, at least one of said contacts being a switch assembly having an actuator arm disposed in the path of said striker arm, said switch assembly being connected to apply, when actuated by said striker arm, electric power to a load only if the phase sequence is correct, whereupon reversal of the phase sequence of said multiphase power source causes said striker arm to rotate from one said stationary contact to the other said stationary contact.

3. An electrical switch in accordance with claim 2 wherein both said stationary contacts are switch assemblies, each of which has an actuator arm disposed in the path of the said striker arm.

4. A phase sequence sensitive electrical switching device arranged to automatically apply power of the proper phase sequence to a load regardless of the phase sequence of the power source, comprising a small alternating current motion-producing device having a movable member and a multiphase input winding, said winding when connected to a multiphase power source, causing movement of said movable member either in a first direction, or in a direction opposite said first direction, depending upon the phase sequence of the power source, and a plurality of electrical contact means disposed in spaced positions in the path of movement of said movable member, a first of said contact means being connected to bring about the application of electric power of proper phase to a load when said movable member is caused to move in a first direction so as to operate said contact means, a second of said contact means being electrically connected to effect an apparent reversal of phase sequence of the power applied to said load when said movable member is caused by an otherwise improper phase sequence to move in the direction opposite said first direction, whereby said phase sensitive switch arrangement will bring about the connection of power of the proper phase sequence to a load despite the original phase sequence of said power.

5. A phase sequence sensitive electrical switching device arranged to automatically apply power of the proper phase sequence to a load regardless of the phase sequence of the power source, comprising a small alternating current rotary motion producing device having a multiphase input winding to which multiphase power may be applied, and a shaft adapted to rotate either in a first direction, or in a direction opposite to said first direction depending upon the phase sequence of said power, said switching device also comprising a striker arm movable in a direction depending upon the direction of rotation of said shaft, and electrical contact means disposed in spaced positions in the path of travel of said striker arm and arranged so that upon the movement of said striker arm in said first direction, a first of said contact means will be operated to bring about the application of electrical current of proper phase to a load, and when said striker arm is caused to move in the direction opposite said first direction as a result of the application of power of different phase sequence to said winding, causing the second of said contact means to be actuated, said second contact means being electrically connected to effect an apparent reversal of phase sequence so as to apply power of proper phase sequence to the load, whereby power of correct phase sequence is applied to a load despite the original phase sequence of said power.

6. A phase sequence sensitive electrical switching device for use with a multiphase load system, comprising a small alternating current rotary motion producing device having a multiphase input winding to which multiphase power may be applied, and a shaft adapted to rotate either in a first direction, or in a direction opposite to said first direction depending upon the phase sequence of said power, said switching device also comprising a striker arm movable in a direction depending upon the direction of rotation of said shaft, and electrical contact means and positive stop means disposed in spaced positions in the path of travel of said striker arm, said contact means being electrically arranged so that upon the movement of said striker arm in said first direction, said contact means will be actuated to bring about the application of electrical current of proper phase to a load, and when said striker arm is caused to move in the direction opposite said first direction as a result of the application of power of reversed phase sequence to said winding, causing said stop means to be contacted, thereby preventing the application of power of improper phase sequence to the load.

7. The phase sequence sensitive electrical switch arrangement as defined in claim 6, including means to provide a warning of phase sequence reversal.

References Cited in the file of this patent
UNITED STATES PATENTS

| | | |
|---|---|---|
| 1,284,937 | Simon | Nov. 12, 1918 |
| 1,691,433 | Dresser | Nov. 13, 1928 |
| 1,740,405 | Kearsley | Dec. 17, 1929 |
| 2,073,587 | Parissi | Mar. 9, 1937 |
| 2,813,169 | Adelson | Nov. 12, 1957 |